US012673964B2

(12) United States Patent
Wu et al.

(10) Patent No.: US 12,673,964 B2
(45) Date of Patent: Jul. 7, 2026

(54) CRYSTAL OF THYROID HORMONE B RECEPTOR AGONIST, PROCESS FOR PREPARING THE SAME AND USE THEREOF

(71) Applicant: GANNEX PHARMA CO., LTD., Shanghai (CN)

(72) Inventors: Jinzi Jason Wu, Shanghai (CN); Bin Liang, Shanghai (CN); Jian Wu, Shanghai (CN)

(73) Assignee: GANNEX PHARMA CO., LTD., Shanghai (CN)

( * ) Notice: Subject to any disclaimer, the term of this patent is extended or adjusted under 35 U.S.C. 154(b) by 485 days.

(21) Appl. No.: 18/029,579

(22) PCT Filed: Sep. 30, 2020

(86) PCT No.: PCT/CN2020/119162
§ 371 (c)(1),
(2) Date: Mar. 30, 2023

(87) PCT Pub. No.: WO2022/067602
PCT Pub. Date: Apr. 7, 2022

(65) Prior Publication Data
US 2023/0357293 A1 Nov. 9, 2023

(51) Int. Cl.
*C07F 9/6571* (2006.01)

(52) U.S. Cl.
CPC ........ *C07F 9/6571* (2013.01); *C07B 2200/13* (2013.01)

(58) Field of Classification Search
CPC .......................... C07F 9/6571; C07B 2200/13
USPC ......................................................... 514/101
See application file for complete search history.

(56) References Cited

FOREIGN PATENT DOCUMENTS

WO 2006128056 A2 11/2006
WO WO2019183004 A1 * 9/2019 .......... C07F 9/65742

OTHER PUBLICATIONS

International Search Report from application No. PCT/CN2020/119162, mailed on Jun. 20, 2021.
Boyer et al., Synthesis and Biological Evaluation of a Series of Liver-Selective Phosphonic Acid Thyroid Hormone Receptor Agonists and Their Prodrugs, J. Med. Chem, (2008), 51:7075-7093.

* cited by examiner

*Primary Examiner* — Jeffrey S Lundgren
*Assistant Examiner* — Heather Dahlin
(74) *Attorney, Agent, or Firm* — Nevrivy Patent Law Group P.L.L.C.

(57) ABSTRACT

Disclosed are crystal of thyroid hormone β receptor agonist, process for preparing the same and use thereof. The crystal with basically no hygroscopicity, a relatively small crystal particle size and a relatively large drug specific surface area can improve the dissolution rate of drugs, is beneficial to the absorption of drugs and improves the bioavailability.

18 Claims, 4 Drawing Sheets

CRYSTAL OF THYROID HORMONE B RECEPTOR AGONIST, PROCESS FOR PREPARING THE SAME AND USE THEREOF

FIELD

The present disclosure relates to the pharmaceutical field, and in particular, to a crystal of thyroid hormone β receptor agonist, a process for preparing the crystal, a pharmaceutical composition comprising the crystal, and use thereof.

BACKGROUND

The compound of formula I (the molecular formula is $C_{28}H_{32}ClO_5P$, the molecular weight is 514.98, and the CAS registration number is 852948-13-1) is a cyclic phosphonate compound. As a novel oral thyroid hormone β receptor agonist (THR-beta Agonist), it is a high-efficiency and low-toxicity candidate drug for nonalcoholic steatohepatitis (NASH) by selectively activating THR-β, regulating gene expression of downstream CYP7A, SREBP-1c and the like, effectively promoting decomposition of fatty acid and stimulating biogenesis of mitochondria, reducing levels of low-density lipoprotein and triglyceride, reducing fat toxicity, improving liver function and reducing liver fat.

I

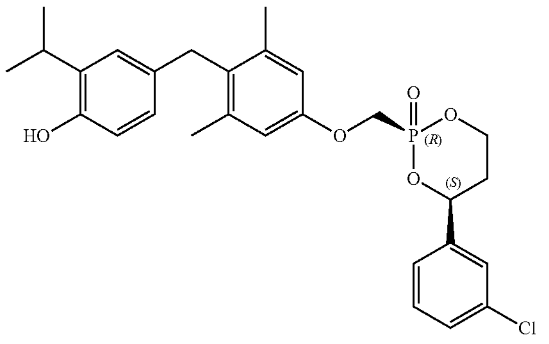

However, when the amorphous compound is used during pharmaceutical production, there are problems of poor stability, strong hygroscopicity and the like. At present, the process for preparing the crystal of the compound disclosed in the field has the problem of poor reproducibility, and a lot of preparation processes also need to add a seed crystal in the preparation process so that the preparation steps become very tedious. Therefore, there is a need for developing a crystal of the compound of formula I with better performance and a process for preparing the crystal of the compound of formula I with better reproducibility and simpler steps.

BRIEF DESCRIPTION

To this end, the objective of the present disclosure is to provide a crystal of a compound of formula I with basically no hygroscopicity, a relatively small crystal particle size and a relatively large drug specific surface area, which can improve the dissolution rate of drugs, is beneficial to the absorption of drugs and improves the bioavailability. The crystal of the compound of formula I provided in the present disclosure can be simply referred to as the crystal form I of the compound of formula I in the present disclosure.

The present disclosure relates to a crystal of a compound of formula I, having diffraction peaks at 2θ angles using Cu-Kα radiation of 12.124±1, 15.483±1, 16.38±1, 16.666±1, 19.089±1, 20.415±1, and 20.821±1 in an X-ray power diffraction pattern,

I

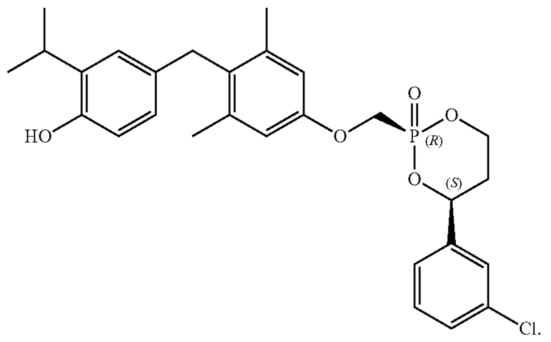

Preferably, the crystal of the present disclosure has diffraction peaks at 2θ angles using Cu-Kα radiation of 7.951±1, 12.124±1, 13.555±1, 15.483±1, 16.017±1, 16.38±1, 16.666±1, 19.089±1, 20.415±1, 20.821±1, 21.764±1, 22.34±1, 22.628±1, 24.055±1, and 26.426±1 in an X-ray powder diffraction pattern.

Specifically, the X-ray powder diffraction pattern at 2θ angles using Cu-Kα radiation of the crystal form I of the compound of formula I provided in the present disclosure has a spacing d (Å) as shown in Table 1.

TABLE 1

Spacing d of Characteristic Peaks in in X-Ray Powder Diffraction Pattern of Crystal Form I of Compound of Formula I

| Diffraction Angles 2θ (°) | Spacing d (Å) |
|---|---|
| 7.951 | 11.10997 |
| 12.124 | 7.29432 |
| 13.028 | 6.79017 |
| 13.555 | 6.52728 |
| 15.483 | 5.71856 |
| 16.017 | 5.52886 |
| 16.38 | 5.40732 |
| 16.666 | 5.31514 |
| 18.757 | 4.72694 |
| 19.089 | 4.64553 |
| 19.723 | 4.49769 |
| 20.415 | 4.3467 |
| 20.821 | 4.26285 |
| 21.764 | 4.0802 |
| 22.34 | 3.97631 |
| 22.628 | 3.92647 |
| 23.863 | 3.72596 |
| 24.055 | 3.69653 |
| 24.472 | 3.6346 |
| 24.607 | 3.61485 |
| 24.956 | 3.56512 |
| 26.426 | 3.37005 |
| 26.832 | 3.31992 |
| 28.388 | 3.14142 |

More preferably, the crystal form I of the compound of formula I provided in the present disclosure has an X-ray powder diffraction pattern at 2θ angles using Cu-Kα radiation as shown in FIG. 1.

The crystal form I of the compound of formula I provided in the present disclosure has an endothermic peak at 111.92° C. when subject to thermal analysis using differential scanning calorimetry (DSC).

The present disclosure relates to a process for preparing the crystal form I of the compound of formula I, comprising (1) dissolving an amorphous compound of formula I in a first solvent to precipitate a solvate of the compound of formula I; and (2) dissolving the solvate obtained in step (1) in a second solvent, and pulping and/or crystallizing to obtain the crystal.

Optionally, the present disclosure relates to a process for preparing the crystal form I of the compound of formula I, comprising:

(1) dissolving an amorphous compound of formula I in a first solvent to precipitate a solvate of the compound of formula I; and (2) pulping the solvate obtained in step (1) to obtain the crystal;

In the preparation process of the present disclosure, the first solvent is selected from the group consisting of $C_1$-$C_4$ lower alcohols such as methanol, ethanol or isopropanol; $C_3$-$C_6$ lower ketones such as acetone or butanone; acetonitrile; methyl tert-butyl ether; diisopropyl ether; $C_5$-$C_8$ linear and branched alkanes such as n-hexane; $C_5$-$C_8$ cycloalkanes; and a mixture of any two or more thereof, preferably the first solvent is methyl tert-butyl ether and/or ethanol; and more preferably the first solvent is methyl tert-butyl ether.

In the preparation process of the present disclosure, preferably, after an amorphous compound of formula I is dissolved in the first solvent, stirring is carried out, and the precipitated solvate of the compound of formula I is filtered and/or dried.

In the preparation process of the present disclosure, the second solvent is selected from the group consisting of $C_1$-$C_4$ lower alcohols such as methanol, ethanol or isopropanol; $C_3$-$C_6$ lower ketones such as acetone or butanone; and a mixture of any two or more thereof; preferably, the second solvent is selected from the group consisting of methanol, ethanol, acetone, isopropanol, and a mixture of any two or more thereof, more preferably the second solvent is ethanol.

In the preparation process of the present disclosure, preferably, the pulping and/or crystallizing is carried out in a third solvent. The pulping can be directly pulping the solvate obtained in step (1), or the solvate obtained in step (1) can be dissolved in the second solvent, and the crystal is obtained by pulping and/or crystallizing. The third solvent can select a solvent that is difficult to dissolve the crystal, preferably water, ethanol or a mixture of ethanol and water. The pulping can be carried out under negative pressure and/or stirring, and/or the crystallizing can be carried out under stirring to promote precipitation of crystal. Preferably, concentration may can be carried out under reduced pressure prior to crystallization. Pulping can be further carried out after crystallization, so that the purity of the obtained product is improved. The step can be repeated for many times so that the purity of the product reaches an ideal standard. The preparation process of the present disclosure can further comprise the step of filtering, washing and/or drying the obtained crude crystal product.

The present disclosure also relates to a pharmaceutical composition comprising a crystal form I of the compound of formula I and optionally a pharmaceutically acceptable excipient. The crystal form I of the compound of formula I of the present disclosure can be made into a pharmaceutical composition together with one or more pharmaceutically acceptable carriers, excipients or diluents. The pharmaceutical composition can be a solid oral formulation, a liquid oral formulation, an injection and the like.

The crystal form I of the compound of formula I provided in the present disclosure can selectively activate THR-β, regulate gene expression of downstream CYP7A, SREBP-1c and the like, effectively promote the decomposition of fatty acid and stimulate the biogenesis of mitochondria, reduce the levels of low-density lipoprotein and triglyceride, which thereby reduces fat toxicity and improves liver function, reduces liver fat. The crystal form I can be used as an active ingredient for preparing a therapeutic medicament for nonalcoholic steatohepatitis (NASH) and the like. As the crystal form I of the compound of formula I provided in the present disclosure has a relatively small crystal particle size and a relatively large specific surface area of the drug, the dissolution rate of the drug can be increased, which is more beneficial to the absorption of drugs and improves the bioavailability. Therefore, the present disclosure also relates to use of the crystal form I of the compound of formula I or the pharmaceutical composition comprising the crystal form I of the compound of formula I in the preparation of a medicament for treating non-alcoholic steatohepatitis.

BRIEF DESCRIPTION OF THE DRAWINGS

Specific embodiments of the disclosure are illustrated in conjunction with the following drawings.

DETAILED DESCRIPTION

Figure 1:
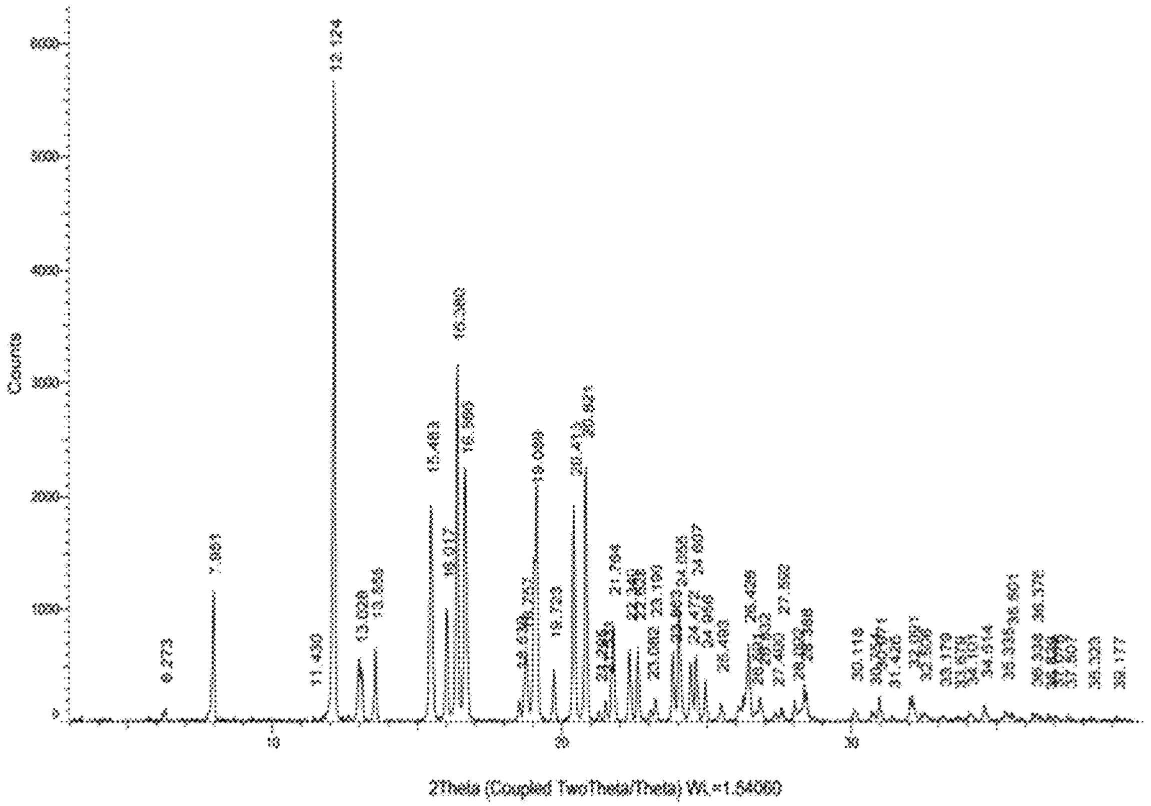
FIG. 1 is an X-ray powder diffraction (PXRD) pattern of the crystal form I of the compound of formula I of the present disclosure.

The present disclosure will be further described below with reference to the embodiments. It should be noted that the following examples are merely illustrative and are not intended to limit the present disclosure. Various changes made by those skilled in the art according to the teachings of the present disclosure shall fall within the scope sought protection in the claims of the present disclosure.

The differential scanning calorimetry (DSC) conditions of the crystal form I of the compound of formula I used in the present disclosure are: heating rate: 10° C./min; heating range: 0-300° C.; pressure: 1013 Mbar; pressure rise rate: left: 20 mL/min, right: 100 mL/min. The used instrument is differential scanning calorimeter/DSC1.

The X-ray power diffraction (XRPD) pattern of the crystal form I of the compound of formula I of the present disclosure is tested on X-ray powder diffraction/D8 ADVANCE. X-ray source: Cu; voltage: 40 KV; current: 40 mA; scanning range: 3-40°; step length of scanning: 0.02°; and the retention time of each step: 0.1 s.

The infrared absorption spectrum conditions of the crystal form I of the compound of formula I used in the present disclosure are: instrument model: Frontier Fourier transform infrared spectrometer (FX057); potassium bromide tablet; wavelength interval: 400-4000 $cm^{-1}$; and resolution: 4.0 $cm^{-1}$.

The ultraviolet absorption spectrum conditions of the crystal form I of the compound of formula I used in the present disclosure are: instrument model: Lambda 365 Ultraviolet visible spectrophotometer (FX058); wavelength interval: 200-800 $cm^{-1}$; scanning speed: 480 nm/min; slit width: 2 nm; and light speed mode: double light speed.

The Raman spectrum conditions of the crystal form I of the compound of formula I used in the present disclosure are: instrument model: DXR2xi dispersive laser confocal micro-Raman spectrometer; and excitation wavelength: 532 nm.

The thermogravimetric analysis (TGA) conditions of the crystal form I of the compound of formula I used in the present disclosure are: instrument name/model: thermogravimetric analyzer/TGA/DSC 2; heating range: 25-500° C. heating rate: 10° C./min; pressure: 1013 Mbar; and pressure rise rate: 20 mL/min.

The particle size conditions of the crystal form I of the compound of formula I used in the present disclosure are: name/model of detection instrument: micrometer particle size analyzer/MS3000; test method: dry method; sample injection rate: 50%; air pressure: 2.5 bar; slit width: 2.0 mm; refractive index: 1.52; absorption rate: 0.1; shade degree: 0.5% to 6%; background measurement time: 10 s; and sample measurement time: 10 s.

Example 1: Preparation of Crystal Form I of Compound of Formula I 10 g of the amorphous sample of the compound of formula I was taken, dissolved at room temperature in 100 mL of methyl tert-butyl ether (MTBE), stirred for 5 h, filtered and dried to obtain the MTBE solvate of the compound of formula I for subsequent experiments.

8 g of MTBE solvate of the compound of formula I was weighed, dissolved with absolute ethyl alcohol and concentrated under reduced pressure to about 24 g at 25 to 35° C. The resultant was transferred to a 250 mL single-port eggplant bottle. 16 to 20 mL of water was dropwise added while stirring. After dropwise addition, the resultant was stirred under negative pressure for 1 to 2 hours. After solid was precipitated, about 100 mL of water was dropwise added. The resultant was stirred at negative pressure for 12 to 20 hours, filtered and dried to obtain the crystal form I of the compound of formula I of the present disclosure. The production was 7.12 g and the yield was 89.0%.

Figure 2:
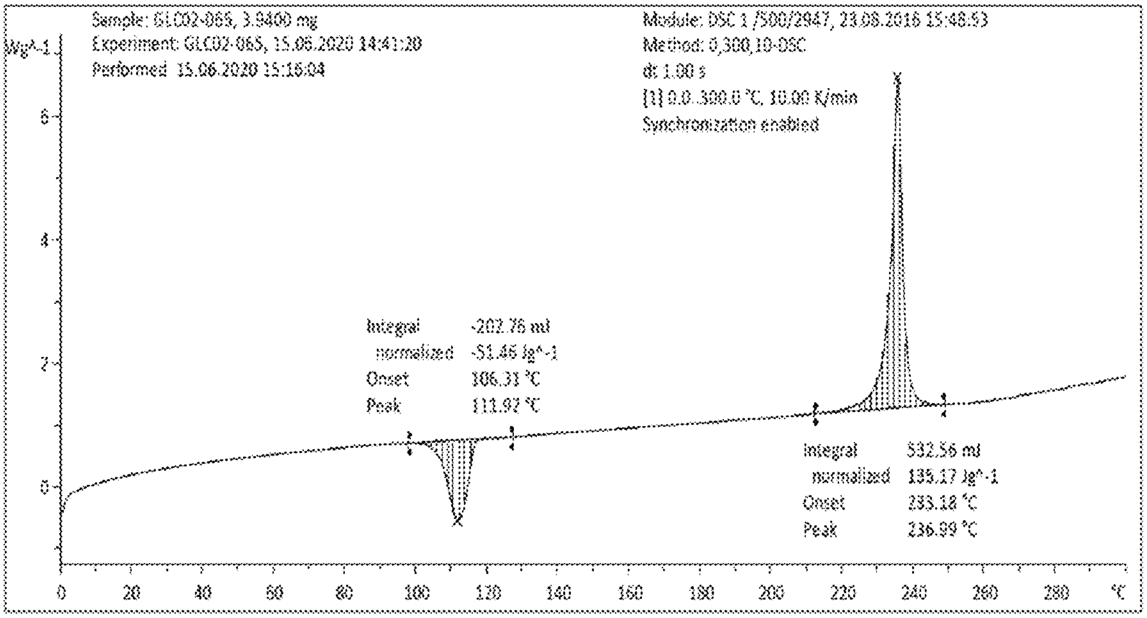
FIG. 2 is a differential scanning calorimetry (DSC) of the crystal form I of the compound of formula I of the present disclosure.
Figure 3:
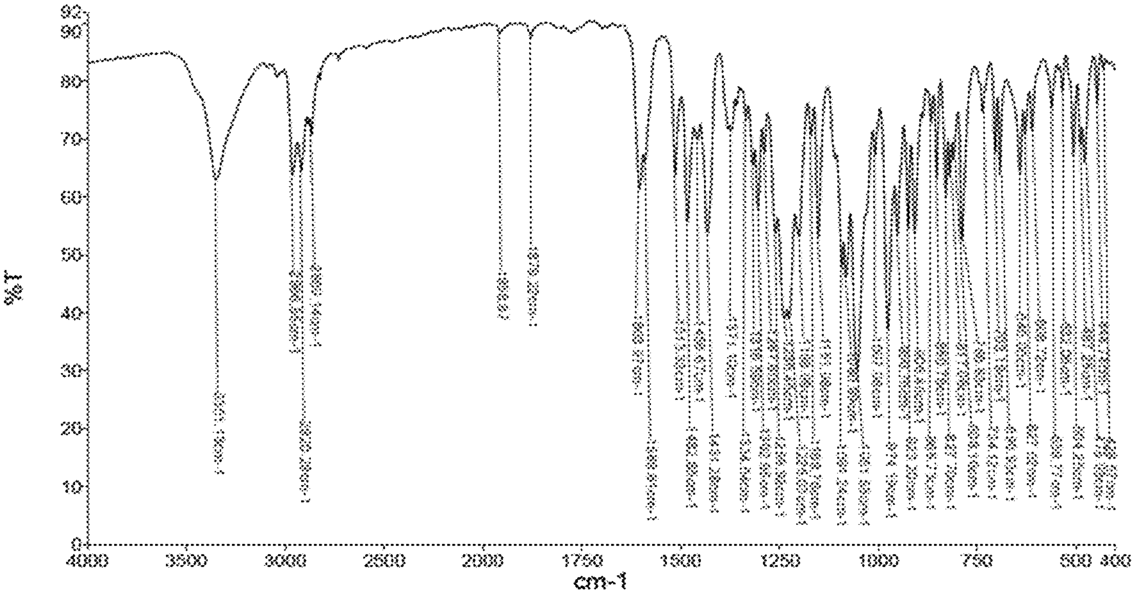
FIG. 3 is an infrared absorption spectrum of the crystal form I of the compound of formula I of the present disclosure.
Figure 4:
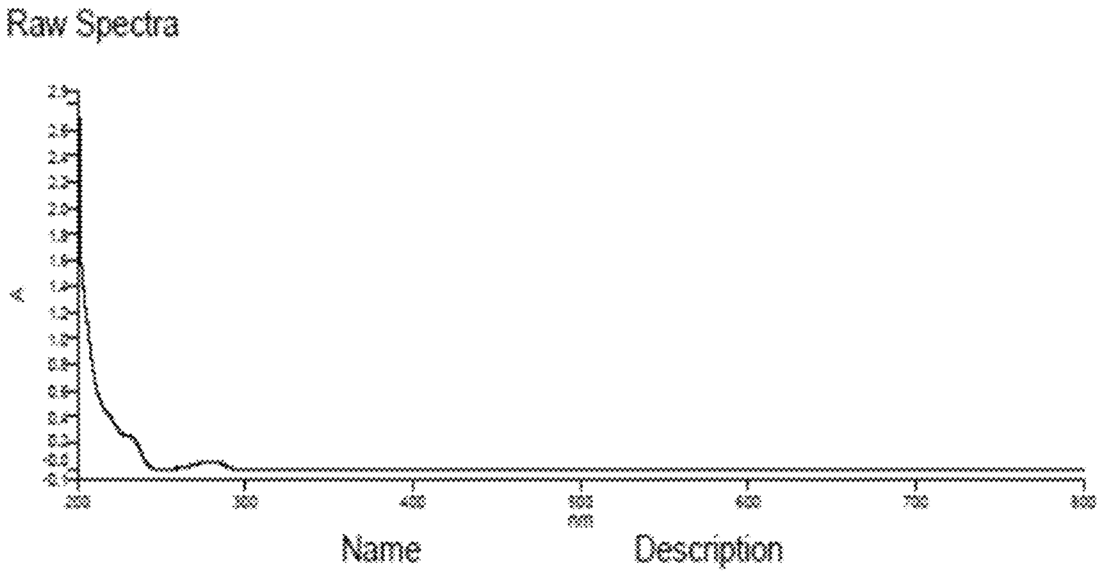
FIG. 4 is an ultraviolet absorption spectrum of the crystal form I of the compound of formula I of the present disclosure.
Figure 5:
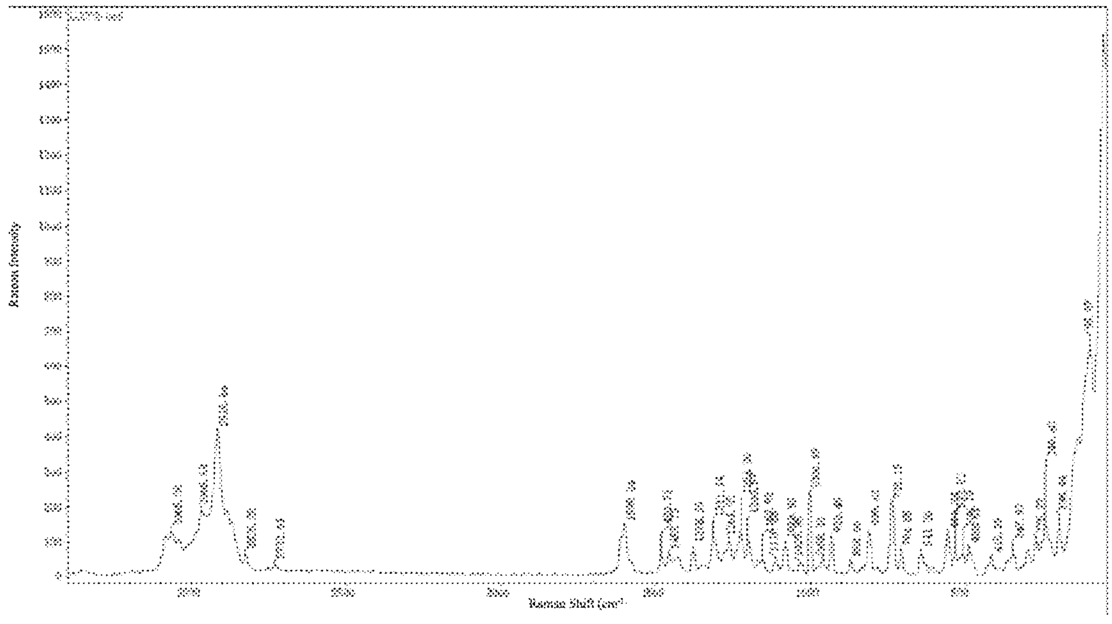
FIG. 5 is a Raman spectrum of the crystal form I of the compound of formula I of the present disclosure.

The measured melting point of the crystal form I was 107.2 to 109.7° C. FIG. 1 and Table 2 are X-ray powder diffraction (PXRD) pattern and data of the crystal form I of the compound of formula I of the present disclosure. FIG. 2 is the differential scanning calorimetry (DSC) of the crystal form I of the compound of formula I of the present disclosure. FIG. 3 and Table 3 are the infrared absorption spectrum and data of the crystal form I of the compound of formula I of the present disclosure. FIG. 4 and Table 4 are the ultraviolet absorption spectrum and data of the crystal form I of the compound of formula I of the present disclosure. FIG. 5 is the Raman spectrum of the crystal form I of the compound of formula I of the present disclosure.

TABLE 2

Data of Powder Diffraction of Crystal Form I

| Diffraction Angles 2θ (°) | Spacing d (Å) | Intensity |
|---|---|---|
| 7.951 | 11.10997 | 16.4% |
| 12.124 | 7.29432 | 100.0% |
| 13.028 | 6.79017 | 7.7% |
| 13.555 | 6.52728 | 11.5% |
| 15.483 | 5.71856 | 35.0% |
| 16.017 | 5.52886 | 18.1% |
| 16.38 | 5.40732 | 56.4% |
| 16.666 | 5.31514 | 38.2% |
| 18.757 | 4.72694 | 9.9% |
| 19.089 | 4.64553 | 33.5% |
| 19.723 | 4.49769 | 8.4% |
| 20.415 | 4.3467 | 34.9% |
| 20.821 | 4.26285 | 41.0% |
| 21.764 | 4.0802 | 15.4% |
| 22.34 | 3.97631 | 11.4% |
| 22.628 | 3.92647 | 11.5% |
| 23.863 | 3.72596 | 7.9% |
| 24.055 | 3.69653 | 16.8% |
| 24.472 | 3.6346 | 7.6% |
| 24.607 | 3.61485 | 8.6% |
| 24.956 | 3.56512 | 7.0% |
| 26.426 | 3.37005 | 11.0% |
| 26.832 | 3.31992 | 4.1% |
| 28.388 | 3.14142 | 4.8% |

TABLE 3

Infrared Absorption Spectrum Attribution of Crystal Form I

| Absorption Peak ($cm^{-1}$) | Intensity of Absorption Peak | Vibration Types | Groups |
|---|---|---|---|
| 3351.13 | Strong | νO—H | hydroxyl-OH |
| 1236.45 | Strong | νC—O | CO |
| 1080.99 | Strong | δC—O | |
| 2966.55 | Strong | νC—H | Ar—H |
| 2869.14 | Medium | νC—H | —CH2 |
| 1080.99 | Strong | νP—O—C | P—O—C |
| 1051.55 | Strong | (fatty group) | |
| 1603.97 | Medium | νC—C | Benzene skeleton |
| 1513.33 | Medium | | vibration |
| 1482.65 | Medium | | |
| 1431.28 | Medium | | |
| 1236.46 | Medium | νC—O | ethers-C—O—C |

TABLE 4

Absorption Peak and Analysis of Ultraviolet Spectrum of Crystal form I

| Sort of Solvent | Maximum Absorption Wavelength (nm) | Absorption Band Attribution |
|---|---|---|
| methanol | 280.9 | benzene B-band |

Example 2: Preparation of Crystal Form I of Compound of Formula I 8 g of MTBE solvate of the compound of formula I obtained in Example 1 was weighed, pulped for 20 hours with a mixed solution of 8 mL of absolute ethyl alcohol and 80 mL of water, filtered and dried to obtain a product, which was the crystal form I after test. The production was 7.20 g and the yield was 90.0%.

Example 3: Preparation of Crystal Form I of Compound of Formula I 8 g of MTBE solvate of the compound of formula I obtained in Example 1 was weighed, dissolved with absolute ethyl alcohol, concentrated under reduced pressure at 25 to 35° C. to obtain about 24 g of resultant. The resultant was transferred to 250 mL of a single-port eggplant bottle. 16 to 20 mL of water was dropwise added while stirring. After dropwise addition, the resultant was stirred for 1 to 2 hours to precipitate a lot of solids. 100 mL of water was added, stirred for 10 to 20 hours, filtered and dried to obtain a product, which was the crystal form I after test. The production was 7.25 g and the yield was 90.6%.

Example 4: Preparation of Crystal Form I of Compound of Formula I 8 g of the MTBE solvate of the compound of formula I obtained in Example 1 was weighed, dissolved with absolute ethyl alcohol and concentrated under reduced pressure at 25 to 35° C. to obtain about 24 g of resultant. The resultant was transferred into a dropping funnel. The resultant was dropwise added to a single-neck flask containing 100 mL of water. After dropwise addition, the resultant was continuously stirred for 12 to 20 hours, filtered and dried to obtain a product, which was the crystal form I after test. The production was 6.9 g and the yield was 86.3%.

Example 5: Preparation of Crystal Form I of Compound of Formula I

About 6 g of MTBE solvate of the compound of formula I obtained in Example 1 was weighed, dissolved with 50 to 60 mL of ethanol and concentrated to dryness under reduced pressure. 10 mL of ethanol was added and stirred for about 30 minutes to precipitate a solid. To the solid was added 30 mL of water, stirred for 30 to 60 minutes, supplemented with water for 30 min. The resultant was stirred overnight at room temperature, filtered, washed and dried to obtain a product, which was the crystal form I after test. The production was 4.98 g and the yield was 83.0%.

Example 6: Preparation of Crystal Form I of Compound of Formula I

About 3.71 g of MTBE solvate of the compound of formula I obtained in Example 1 was weighed, pulped for about 1 hour with a mixture of 20 mL of water and 10 mL of absolute ethyl alcohol under negative pressure. 10 mL of water was added and continuously stirred under negative pressure for 1 hour. About 60 mL of water was added. The resultant was stirred overnight at room temperature and normal pressure, filtered, washed and dried to obtain a product, which was the crystal form I after test. The production was 3.23 g and the yield was 87.1%.

Example 7: Preparation of Crystal Form I of Compound of Formula I

About 2 g of MTBE solvate of the compound of formula I obtained in Example 1 was weighed and dissolved with 4 mL of absolute ethyl alcohol. To the resultant mixture was added 1.5 mL of water and stirred at room temperature. 0.5 mL of water was added after 1 hour and continuously stirred for 1 hour. A solid was precipitated. 20 mL of water was added and continuously stirred for 12 to 20 hours. The resultant was filtered, washed and dried to obtain a product, which was the crystal form I after test. The production was 1.73 g and the yield was 86.6%.

Example 8: Preparation of Crystal Form I of Compound of Formula I

About 0.5 g of MTBE solvate of the compound of formula I obtained in Example 1 was weighed and dissolved with 2.5 mL of absolute ethyl alcohol. 47.5 mL of water was added and pulped and stirred for 12 to 20 hours. The resultant was filtered, washed and dried to obtain a product, which was the crystal form I after test. The production was 0.41 g and the yield was 82.0%.

Example 9: Preparation of Crystal Form I of Compound of Formula I

About 3 g of MTBE solvate of the compound of formula I obtained in Example 1 was weighed and dissolved with 20 to 30 mL of ethanol. The resultant mixture was concentrated to dryness under reduced pressure. 6 mL of ethanol was added and stirred for about 30 min. A solid was precipitated. The solid was taken out and dissolved with 4 mL of ethanol. 25 mL of water was added and pulped for 20 hours. The resultant was filtered, washed and dried to obtain a product, which was the crystal form I after test. The production was 2.6 g and the yield was 86.7%.

Example 10: Preparation of Crystal Form I of Compound of Formula I 1 g of MTBE solvate of the compound of formula I obtained in Example 1 was weighed and dissolved with 20 to 30 mL of methanol. The resultant mixture was concentrated to dryness under reduced pressure. The solid was dissolved with about 2 to 3 mL of methanol. About 1 mL of water was added for crystallization. After dropwise addition, the mixture was stirred for 1 hour. 1 mL of water was dropwise added subsequently and stirred for 1 hour. 10 mL of water was added and stirred overnight at room temperature. The resultant was filtered, washed and dried to obtain a product, which was the crystal form I after test. The production was 0.7 g and the yield was 70.0%.

Example 11: Preparation of Crystal Form I of Compound of Formula I 1 g of MTBE solvate of the compound of formula I obtained in Example 1 was weighed and dissolved with about 20 mL of acetone. The resultant mixture was concentrated to dryness under reduced pressure. The solid was dissolved with about 6 mL of acetone. 4 mL of water was dropwise added and stirred for about 30 min to precipitate and filter to obtain a solid. The solid was dissolved with 4 mL of ethanol. 4 mL of water was added and pulped and stirred for 1 hour. 20 mL of water was supplemented and stirred for 12 to 20 hours. The product was the crystal form I after test. The production was 0.81 g and the yield was 81.0%.

Example 12: Preparation of Crystal Form I of Compound of Formula I 3 g of MTBE solvate of the compound of formula I obtained in Example 1 was weighed and dissolved with 30 mL of isopropanol. The resultant mixture was concentrated to dryness under reduced pressure. 10 mL of isopropanol was added and about 4 mL of water was dropwise added for crystallization. After dropwise addition, stirring was continuously carried out for 1 hour. 20 mL of water was added and pulped for 12 to 20 hours. A solid was obtained after filtering. The solid was dissolved with 6 mL of ethanol. 40 mL of water was added and pulped for 12 to 20 hours. The resultant was filtered, washed and dried to obtain a product, which was the crystal form I after test. The production was 2.3 g and the yield was 77.0%.

Example 13: Preparation of Crystal Form I of Compound of Formula I 10 g of an amorphous sample of the compound of formula I was dissolved in 30 mL of ethanol. The resultant mixture was stirred at room temperature for 12 hours to precipitate a solid. An EtOH solvate of the compound of formula I was obtained.

About 5 g of EtOH solvate of the compound of formula I was weighed and pulped with 40 ml of water under negative pressure at room temperature. 5 ml of water was added every 2 hours. In accordance with decreasing trend of water and stirring conditions, an appropriate amount of water was added and stirred for about 6 to 7 hours. The resultant was filtered and washed with water to obtain a solid. The solid was dissolved with 40 mL of water and 4 mL of absolute ethyl alcohol. The mixture was stirred overnight at room temperature and normal pressure. The resultant was filtered, washed and dried to obtain a product, which was the crystal form I after test. The production was 4.3 g and the yield was 86.0%.

Example 14: Particle Size Test of Crystal Form I of Compound of Formula I

The crystal obtained in Example 1 was subject to a particle size test in accordance with the above conditions. The results were shown in Table 5.

TABLE 5

Particle Size Analysis of Crystal Form I

| Test Sample | Specific Area ($m^2$/kg) | Dv (10 μM) | Dv (50 μM) | Dv (90 μM) | Dv (95 μM) |
|---|---|---|---|---|---|
| Example 1 | 807.1 | 6.41 | 20.30 | 48.23 | 59.10 |

Figure 6:
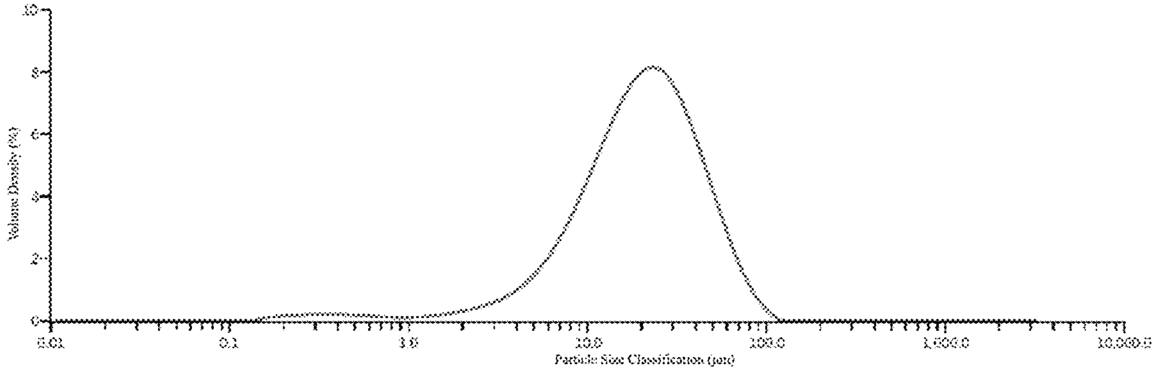
FIG. 6 is a size classification diagram of the crystal obtained in Example 1.

FIG. 6 is a size classification diagram of the crystal obtained in Example 1. It can be seen from FIG. 6 that the crystal form I of the compound of formula I has a relatively small crystal particle size and a large specific surface area, which can improve the dissolution rate of the drug, can be beneficial to the absorption of the drug, and can improve the bioavailability. FIG. 6 also shows that the crystal form I is almost in normal distribution, uniform in particle size distribution and good in uniformity.

Example 15: Hygroscopicity Test of Crystal Form I of Compound of Formula I

About 28 mg of the crystal obtained in Example 1 was taken. The hygroscopicity of the crystal was determined with dynamic moisture adsorption instrument in accordance with the above conditions. The results were shown in Table 6.

TABLE 6

Hygroscopicity Analysis of Crystal Form I

| Test Sample | Weight gain percentage at 80% relative humidity |
|---|---|
| Example 1 | 0.1213% |

Figure 7:
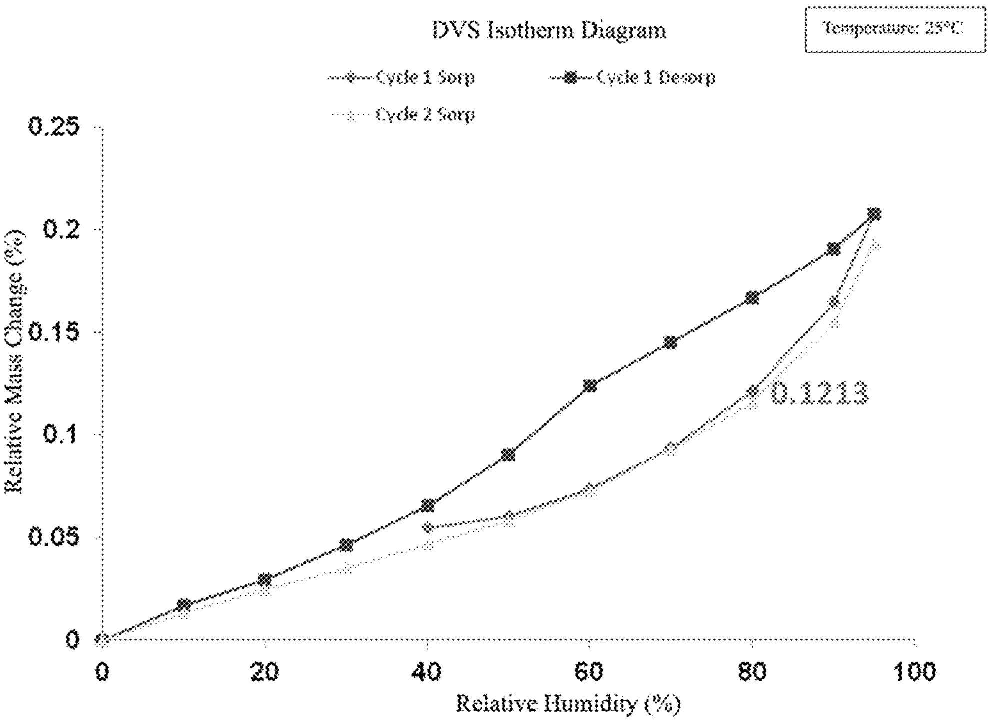
FIG. 7 is a DVS of the crystal obtained in Example 1.

The DVS diagram of the crystal obtained in Example 1 was shown in FIG. 7. The weight gain of crystal form I was within 0.2% at 80% relative humidity. In accordance with the guidance principle of the drug hygroscopicity in the Appendix XIXJ of the Chinese Pharmacopoeia 2015, the crystal form I had no or nearly no hygroscopicity.

Comparative Example 1: Preparation of Other Crystal Forms of Compound of Formula I 1 g of MTBE solvate of the compound of formula I obtained in Example 1 was weighed and dissolved with 30 mL of n-heptane. The resultant mixture was concentrated under reduced pressure. About 1 mL of water was added for crystallization. After dropwise addition of water, stirring was carried out for 1 hour. 1 mL of water was continuously dropwise added. Stirring was carried out for 1 hour. 10 mL of water was supplemented. Stirring was carried out overnight at room temperature. No crystal of the compound of formula I was obtained by the process after test.

Although the present disclosure has been described to a certain extent, it is obvious that appropriate modifications in various conditions may be made without departing from the spirit and scope of the disclosure. It should be understood that the disclosure is not limited to the described embodiments, but is attributed to the scope of the claims, which includes the equivalent substitutions for each factor.

What is claimed is:

1. A crystal of a compound of formula I, having diffraction peaks at 2θ angles using Cu-Kα radiation of 12.124±0.2, 15.483±0.2, 16.38±0.2, 16.666±0.2, 19.089±0.2, 20.415±0.2, and 20.821±0.2 in an X-ray power diffraction pattern,

I

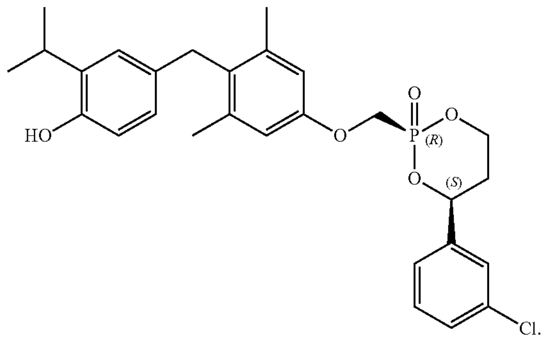

2. The crystal of claim 1, having diffraction peaks at 2θ angles using Cu-Kα radiation of 7.951±0.2, 12.124±0.2, 13.555±0.2, 15.483±0.2, 16.017±0.2, 16.38±0.2, 16.666±0.2, 19.089±0.2, 20.415±0.2, 20.821±0.2, 21.764±0.2, 22.34±0.2, 22.628±0.2, 24.055±0.2, and 26.426±0.2 in an X-ray powder diffraction pattern.

3. The crystal of claim 1, having an endothermic peak at 111.92° C. when subject to thermal analysis using differential scanning calorimetry.

4. A process for preparing a crystal of claim 1, comprising
(1) dissolving an amorphous compound of formula I in a first solvent to precipitate a solvate of the compound of formula I; and
(2) dissolving the solvate obtained in step (1) in a second solvent, and triturating and/or crystallizing to obtain the crystal;
wherein the first solvent is selected from the group consisting of $C_1$-$C_4$ lower alcohols; $C_3$-$C_6$ lower ketones; acetonitrile; methyl tert-butyl ether; diisopropyl ether; $C_5$-$C_8$ linear and branched alkanes; $C_5$-$C_8$ cycloalkanes; and a mixture of any two or more thereof; and
wherein the second solvent is selected from the group consisting of $C_1$-$C_4$ lower alcohols; $C_3$-$C_6$ lower ketones; and a mixture of any two or more thereof.

5. A process for preparing a crystal of claim 1, comprising:
(1) dissolving an amorphous compound of formula I in a first solvent to precipitate a solvate of the compound of formula I; and
(2) triturating the solvate obtained in step (1) to obtain the crystal;
wherein the first solvent is selected from the group consisting of $C_1$-$C_4$ lower alcohols; $C_3$-$C_6$ lower ketones; acetonitrile; methyl tert-butyl ether; diisopropyl ether; $C_5$-$C_8$ linear and branched alkanes; $C_5$-$C_8$ cycloalkanes; and a mixture of any two or more thereof.

6. The process of claim 4, wherein the triturating and/or crystallizing is carried out in a third solvent.

7. The process of claim 4, wherein the triturating is carried out under negative pressure and/or stirring, and/or the crystallizing is carried out under stirring.

8. The process of claim 4, wherein concentration is carried out under reduced pressure before the crystallizing.

9. A pharmaceutical composition comprising the crystal of claim 1, and optionally a pharmaceutically acceptable excipient.

10. A method for treating non-alcoholic steatohepatitis, comprising administering to a subject in need thereof a therapeutically effective amount of the crystal of claim 1.

11. The crystal of claim 1, having an X-ray powder diffraction pattern at 2θ angles using Cu-Kα radiation as shown in FIG. 1, FIG. 1.

12. The process of claim 4, wherein the first solvent is selected from the group consisting of methyl tert-butyl ether, ethanol, and a mixture thereof.

13. The process of claim 4, wherein the second solvent is selected from the group consisting of methanol, ethanol, acetone, isopropanol, and a mixture of any two or more thereof.

14. The process of claim 5, wherein the first solvent is selected from the group consisting of methyl tert-butyl ether, ethanol, and a mixture thereof.

15. The process of claim 6, wherein the third solvent is selected from the group consisting of water, ethanol, and a mixture thereof.

16. The process of claim 5, wherein the triturating is carried out in a third solvent.

17. The process of claim 16, wherein the third solvent is selected from the group consisting of water, ethanol, and a mixture thereof.

18. The process of claim 5, wherein the triturating is carried out under negative pressure and/or stirring.

* * * * *